US011399305B2

(12) United States Patent
Barchi et al.

(10) Patent No.: US 11,399,305 B2
(45) Date of Patent: Jul. 26, 2022

(54) NETWORK EDGE CLOUD ADJUSTMENT

(71) Applicants:AT&T Intellectual Property I, L.P., Atlanta, GA (US); AT&T Mobility II LLC, Atlanta, GA (US)

(72) Inventors: Ronald Samuel Barchi, Maple Valley, WA (US); Erie Lai Har Lau, Redmond, WA (US); Yehoshuva Arasavelli, Redmond, WA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 16 days.

(21) Appl. No.: 16/803,928

(22) Filed: Feb. 27, 2020

(65) Prior Publication Data
US 2021/0274373 A1 Sep. 2, 2021

(51) Int. Cl.
*H04W 28/02* (2009.01)
*H04L 45/00* (2022.01)

(52) U.S. Cl.
CPC ......... *H04W 28/0231* (2013.01); *H04L 45/70* (2013.01)

(58) Field of Classification Search
CPC ............ H04W 28/00; H04W 28/0231; H04W 28/0236; H04W 28/0247; H04W 28/0252; H04W 28/0257; H04W 28/0284; H04W 28/0289; H04L 45/70; H04L 47/10; H04L 47/11; H04L 47/12; H04L 47/122; H04L 47/125
See application file for complete search history.

(56) References Cited

U.S. PATENT DOCUMENTS

| 7,373,394 | B1* | 5/2008 | Li | H04L 12/185 370/389 |
|---|---|---|---|---|
| 10,742,721 | B1* | 8/2020 | Wagner | H04L 12/4641 |
| 2009/0141636 | A1* | 6/2009 | Dolganow | H04L 45/50 370/237 |
| 2012/0151057 | A1* | 6/2012 | Paredes | H04L 12/4641 709/225 |
| 2014/0006843 | A1* | 1/2014 | Kim | G06F 11/2002 714/4.1 |

(Continued)

*Primary Examiner* — Kevin D Mew
(74) *Attorney, Agent, or Firm* — Amin, Turocy & Watson, LLP

(57) ABSTRACT

Adjusting a network path between a user equipment and a network edge cloud instance is disclosed. The adjustment of the network path can be based on performance of the network path. The performance of the network path can be ranked, based on performance, against other network paths. In an embodiment, the other network paths can be between the user equipment and the network edge cloud instance. Additionally, the other network paths can be between the user equipment and another network edge cloud instance that can be located remotely from the network edge cloud instance. In an embodiment, a recommendation can be provided to a cloud service provider to enable the cloud service provider to adjust a characteristic of an application or service performed by a network edge cloud instance. The disclosed subject matter can provide advantages over conventional cloud instances that are typically supported on a device located distant from a network device operated by a network provider.

20 Claims, 10 Drawing Sheets

(56) References Cited

U.S. PATENT DOCUMENTS

| | | | |
|---|---|---|---|
| 2015/0081902 A1* | 3/2015 | Verchere | H04L 41/5051 |
| | | | 709/225 |
| 2015/0350069 A1* | 12/2015 | Padgett | H04L 47/125 |
| | | | 370/236 |
| 2017/0214550 A1* | 7/2017 | Kumar | H04L 43/10 |
| 2017/0214659 A1* | 7/2017 | Madhav | H04L 67/141 |
| 2019/0014038 A1* | 1/2019 | Ritchie | H04L 45/04 |
| 2020/0099549 A1* | 3/2020 | Gummadidala | H04L 12/4633 |
| 2020/0153752 A1* | 5/2020 | Chan | H04L 67/10 |
| 2020/0177489 A1* | 6/2020 | Zeng | H04L 45/745 |
| 2020/0344297 A1* | 10/2020 | Agarwal | H04L 67/2842 |
| 2021/0014160 A1* | 1/2021 | Sugiyama | H04L 45/54 |
| 2021/0044848 A1* | 2/2021 | Liu | H04N 21/251 |
| 2021/0235313 A1* | 7/2021 | Devadoss | H04L 47/2408 |

\* cited by examiner

NETWORK EDGE CLOUD ADJUSTMENT

TECHNICAL FIELD

The disclosed subject matter relates to a network edge cloud, more specifically to supporting a network edge cloud.

BACKGROUND

Conventionally, a cloud service provider (CSP) can deploy an instance of a cloud service, e.g., a service, application, etc., executing on a processor located remote from a user device and accessed via a network. Typically a conventional CSP can deploy cloud service instances via a cloud server that is accessed via a network connection, e.g., a user equipment (UE) can communicate through an edge network connected via a network provider component to a remotely located cloud server. In an aspect, the network provider component can be a network provider core network component, for example, a mobile device can connect to an enhanced packet core (EPC) device of a network provider via a radio access network (RAN) device such as a NodeB, eNodeB, etc. The example EPC device can enable communication, for example via internet connections, with a cloud server that can be located remotely from both the mobile device and the EPC device. As such, conventional CSP services/applications can be associated with communicating data across a RAN path, a network provider path, an internet path, and a cloud server path.

DETAILED DESCRIPTION

Figure 1:
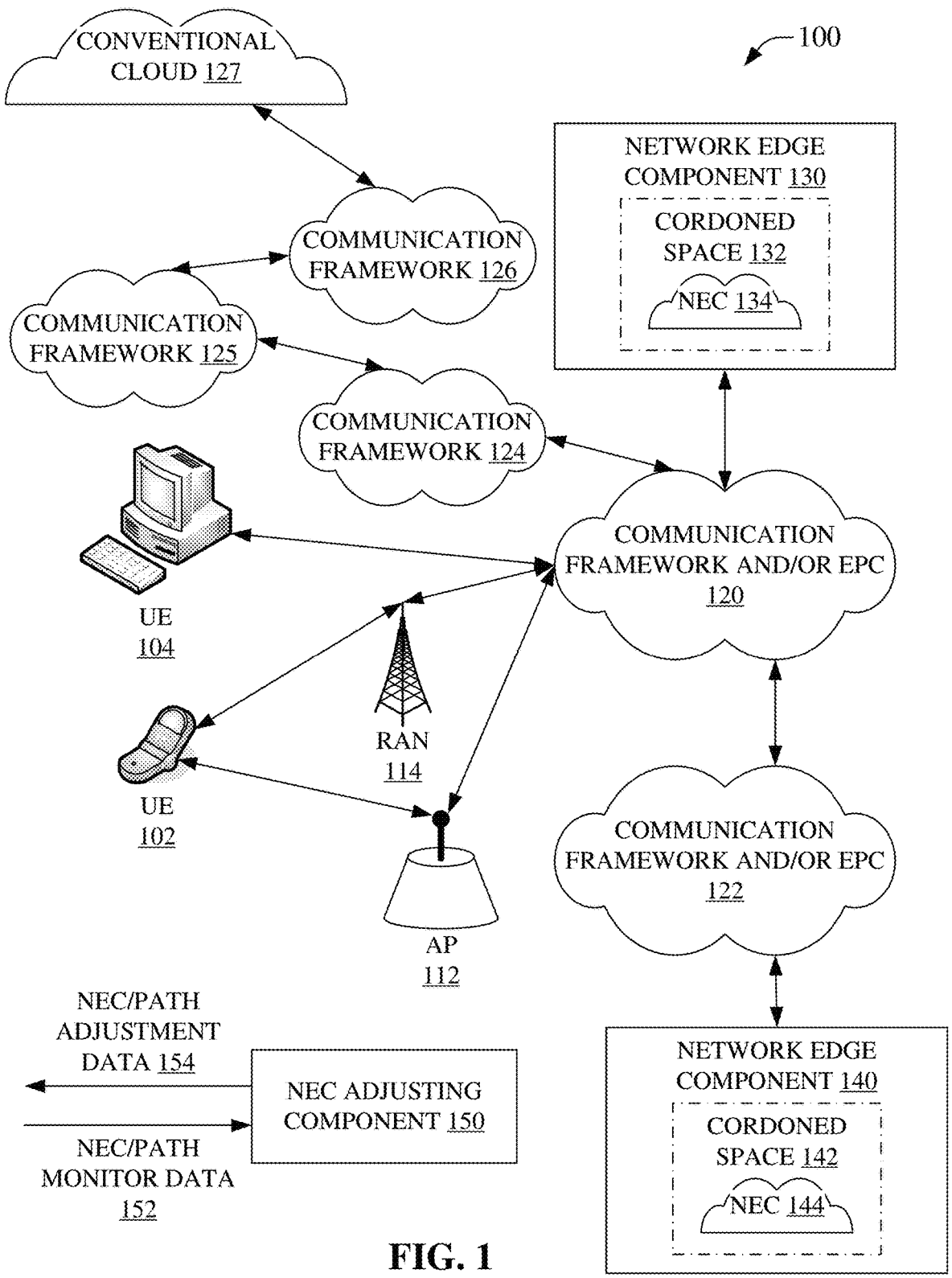
FIG. 1 is an illustration of an example system that can enable a network edge cloud system, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As is noted elsewhere herein, a conventional cloud service provider (CSP) can deploy an instance of a cloud service, via a processor, located remote from a user device and accessed via one or more networks, wherein a network of the networks is typically operated by a network provider. As such, conventional CSP services generally communicate between a CSP instance at a remote server and a UE via a radio access network (RAN), a network provider core network, e.g., an enhanced packet core (EPC), regional network provider node/office, etc., and one or more networks beyond the network provider network. As such, conventional CSP services/applications can typically be associated with communicating data across much longer end-to-end paths than would be experienced where a network edge cloud (NEC) is employed.

A network edge cloud (NEC) can be deployed, for example by a network provider. The NEC can be located much closer to a network provider network than convention cloud servers, e.g., a network provider can operate a network and support a NEC instance that can operate proximate to the provider's network or even be comprised in the provider's network via a device of the network provider, which can alleviate communicating to a more distant conventional cloud server, e.g., a CSP service/application can be executed much closer to a UE than in conventional cloud services. This can create an impetus for the network provider to adjust a network edge, e.g., the network provider can be motivated to optimize interactions with a network edge cloud instance, for example, because the reputation of the network provider is more directly associated with performance of a NEC than might be attributed to the network provider as just a middle man in a conventional cloud service environment. As an example, a provider can operate a regional office having an EPC node. The example provider can conventionally route CSP service data to/from a remotely located cloud server located, for example, in another city, state, country, etc. In this example, the provider can deploy a network edge cloud service that can comprise a NEC component co-located in the example regional office. Accordingly, rather than routing traffic to/from some distant CSP server, the CSP service can be performed at the local NEC component allowing for corresponding improvements in performance. Moreover, as is disclosed herein below, the provider can be motivated to optimize the NEC experience, for example, where the provider is now tightly associated with the CSP service, e.g., the provider typically will control the RAN, core, and NEC networks and, as such, lackluster performance may be directly associated with the reputation of the provider. This can be in contrast to conventional CSP services where performance could be attributed to either the network provider (RAN, core, etc.) or to the other networks beyond the network provider's as the traffic traversed the internet, etc., to reach, or return from, a remotely located CSP server, e.g., the network provider could just be viewed as a middle man rather than as an entity controlling the performance of, or access to, a NEC.

In an embodiment, a NEC instance can be more tightly integrated with a provider network than a conventional CSP service instance. A network provider, hereinafter 'provider' for simplicity, can facilitate communications between a UE and provider network components, e.g., a provider can operate a network(s) between the example UE and an instance of a NEC. As an example, a wireless carrier, e.g., a provider, can operate a RAN that can provide service for a user's mobile device. The provider's RAN can communicate via a provider network to a regional office supporting a regional instance of a provider core network. The regional office can comprise a NEC instance, for example executing on an edge server located proximate to, or in, the regional office. A CSP can instantiate a cloud service/application via the example NEC instance. This can enable the UE to access the cloud service via the NEC at the regional office, which can be an improvement over the conventional further communication of traffic to a remotely located cloud server via one or more other networks. In addition to typically being located more proximate to the UE, the NEC instance can be managed by the provider, e.g., the provider can adjust the computing resources dedicated to the NEC instance, etc. Moreover, the provider can monitor and adapt the networks between the UE and the NEC instance to improve performance, e.g., adjusting RAN parameter, alternate routing between an access node and the core network of the provider, etc. Further, the provider can monitor usage of the NEC instance and can provide related recommendations to the CSP, for example, altering the NEC instance, provisioning an additional NEC instance, contracting a less used NEC instance(s), indicating computing resource headspace that can allow the CSP to employ other cloud service features, etc. As an example, a CSP application can typically employ a first input modality and a first video resolution based on contracted computing services that are supported via the provider's NEC instance. Where the example NEC instance is experiencing light traffic to the CSP application, contracted resources can be underutilized. An edge cloud component of the provider can determine the underutilization and can notify the CSP accordingly. The CSP can then alter the CSP application to consume more resources to better utilize the example contracted limits, e.g., a better video resolution can be employed, an alternate user input can be allowed, e.g., voice control can be added on top of touch screen input, etc. Similarly, where a NEC instance is transitioning a performance threshold, the CSP can be similarly notified and the CSP application/service can be modified, e.g., in the above example, where additional traffic is occurring, the video resolution can return to the default value and voice input can be suspended, etc.

In an aspect, a provider can operate more than one edge cloud, e.g., a provider can support NEC instances in different edge cloud networks. As an example, a Seattle regional office of a provider can support a first edge cloud that can facilitate a first NEC instance for a CSP. The provider, for example, can further support a second edge cloud at a Sacramento regional office, wherein the second edge cloud can facilitate a second NEC instance for the CSP. A UE can be connected to the first example NEC instance but can move, such as driving between Seattle and Sacramento, such that it can become more efficient to move the UE to the second NEC instance. As an alternate example, where the example UE is connected to the first NEC instance in Seattle, but heavy network traffic is slowing access, the provider can move the UE to the second NEC instance to improve access. As a further example, the second NEC instance can have a CSP application that is not available on the first NEC instance and the UE can be moved to the second NEC instance to provide access to the additional CSP application. In yet another example, the first and second NEC instances can be more heavily burdened at 4 pm Pacific Standard Time than a third NEC instance in a Boston regional edge cloud, which would be at 7 pm Eastern Standard Time, and the provider can balance NEC instance usage by routing the example UE from the West coast NEC instances to the East coast NEC instance(s).

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can support a network edge cloud system, in accordance with aspects of the subject disclosure. System 100 can comprise NEC instance 134 that can be facilitated by cordoned space 132 of network edge component 130. In an aspect, network edge component 130 can be proximate to communication framework and/or EPC instance 120, e.g., NEC instance 134 can be executing at or near to a core network/EPC component of a provider. It is noted that, while generally applied to 4G technologies, the term 'EPC,' as relates to the subject disclosure, is intended to include equivalent core network elements, such as a 5G core network device, etc., in other current and/or future network technologies. Accordingly, UE 102 or 104 can more readily communicate with NEC instance 134 than a cloud instance via conventional cloud 127. This can be understood in that UE 102 and or 104 can be connected to a communication framework of a provider, e.g., communication framework and/or EPC 120, for example, via RAN 114 or AP 112, rather than also needing to traverse another communication framework(s), e.g., communication frameworks 124, 125, 126, etc., to reach conventional cloud 127.

In an aspect, communication framework and/or EPC instance 120 can be coupled to other provider resources, e.g., communication framework and/or EPC instance 122. In an embodiment, connection to other provider resources can enable access to other edges provided by the network provider, e.g., network edge component 140. As an example, a national wireless network provider can operate network edge component 130, which can support a network edge in Seattle, and network edge component 140, which can support a network edge in Boston. Accordingly, in this example, UE 102 can access NEC 134 via RAN component 114, for example located in Seattle, that can communicate via communication framework and/or EPC instance 120, for example a Seattle instance of the provider EPC, to access a CSP application executing in NEC 134, wherein NEC 134 can be comprised in network edge component 130 that can also be located in Seattle. Similarly, in this example, UE 102 can access NEC 144 via RAN component 114, for example located in Seattle, that can communicate via communication frameworks and/or EPC instances 120 and 122, for example a Seattle instance of the provider EPC and a Boston instance of the provider EPC, to access a CSP application executing in NEC 134 and/or a CSP application executing in NEC 144, wherein NEC 134 can be comprised in network edge component 130 that can also be located in Seattle, and wherein NEC 144 can be comprised in cordoned space 142 of network edge component 140 that can be located in Boston. In contrast, a conventional cloud service can operate, for example, out of a Dallas cloud server that supports access from various providers from locations all over the USA, e.g., a conventional cloud server acts in a more centralized manner than network edge cloud components distributed in various geographic regions. Moreover, a conventional cloud can be operated by entities other than a provider, wherein the provider can have advantages over the conventional technology by providing provider operated network edge cloud servers in various markets, for example, direct control over provider NEC components, higher proximity between provider networks and provider NEC servers, etc. In an aspect, a provider can be less of a middle man by providing their own edge clouds for a CSP to deploy applications and services on.

Where, for example, a provider deploys a network edge component(s), e.g., 130, 140, etc., to provide space for a CSP to execute an instance(s) of a network edge cloud, e.g., 134, 144, etc., performance of the network can be more highly dependent on the network provider than on both the network provider and other providers. Accordingly, adjustment of the NEC system can be of a similarly high priority. Adjustment of the NEC system, in an embodiment, can enable more efficient use of computing resources, e.g., network resources, processing resources, memory resources, storage resources, etc. In some embodiments, adjustment of an NEC system can enable expanding or contracting of NEC instances. In further embodiments, adjustment of an NEC system can enable altering the CSP service/application via communication with the CSP regarding performance of the NEC system. In still further embodiments, adjustment of an NEC system can enable migrating CSP service(s)/application(s) employed by a UE between one or more NEC instances. NEC adjusting component 150 can receive NEC/PATH monitoring data 152. NEC adjusting component 150 can determine changes that can be made to the NEC system and/or CSP recommendations based on the NEC system performance. In an aspect, NEC adjusting component 150 can generate NEC/path adjustment data 154. NEC/path adjustment data 154 can enable adaption of various provider controlled network parameters, e.g., altering a network path between the UE and the NEC instance, modifying a RAN parameter to improve signal strength, reduce, packet loss, improve bandwidth, etc., or nearly any other wired or wireless network parameter related to communicating data between a UE and a NEC instance. In some embodiments, NEC/path adjustment data 154 can comprise CSP recommendations that can be employed by a CSP to alter services/applications of the NEC, e.g., NEC instance 134, NEC instance 144, etc. In an aspect, the provider can provide the cordoned space for an NEC instance, e.g., 132 and 134, etc., but can opt to not participate in the management of the service/application of the NEC instance and defer to the CSP to manage the service/application executing in the NEC instance, e.g., the provider can provide network access and server space but can be independent of any service/application performed on the provided server space.

Figure 2:
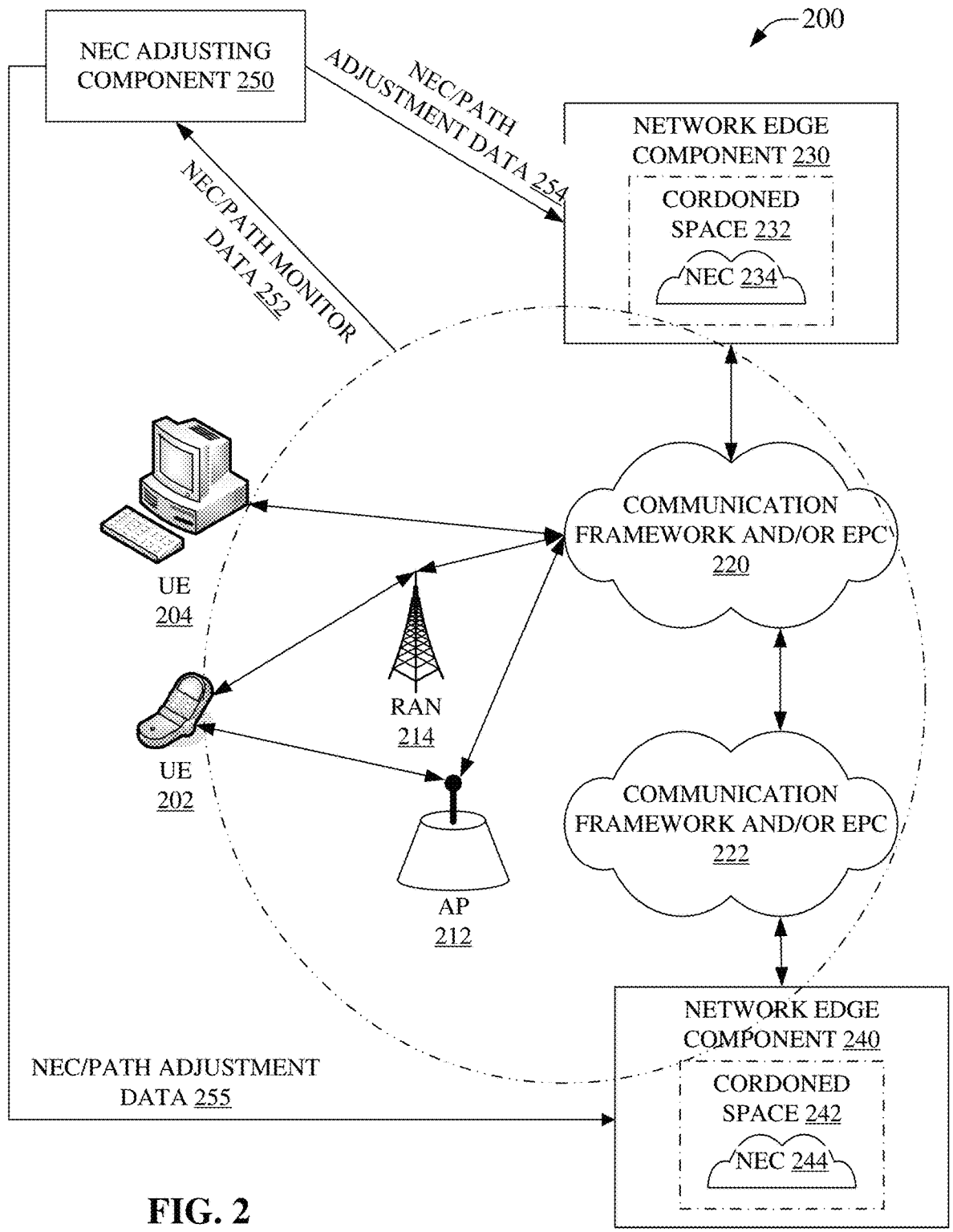
FIG. 2 is an illustration of an example system that can facilitate adjustment of a network edge cloud system, in accordance with aspects of the subject disclosure.

FIG. 2 is an illustration of a system 200, which can enable adjustment of a network edge cloud system, in accordance with aspects of the subject disclosure. System 200 can comprise NEC instance 234 that can be facilitated by cordoned space 232 of network edge component 230. In an aspect, network edge component 230 can be proximate to communication framework and/or EPC instance 220, e.g., NEC instance 234 can be executing at, or near, to a core network/EPC component of a provider. Accordingly, UE 202 or 204 can more readily communicate, for example via RAN 214, AP 212, etc., with NEC instance 234 than a cloud instance via conventional cloud. In an aspect, communication framework and/or EPC instance 220 can be coupled to other provider resources, e.g., communication framework and/or EPC instance 222. In an embodiment, connection to other provider resources can enable access to other edges provided by the network provider, e.g., network edge component 240 that can support NEC instance 244 via cordoned space 242.

In system 200, for example, NEC adjusting component 250 can receive NEC/PATH monitoring data 252. NEC adjusting component 250 can determine changes that can be made to the NEC system and/or CSP recommendations based on the NEC system performance. In an aspect, NEC adjusting component 250 can generate NEC/path adjustment data 254, 255, etc. NEC/path adjustment data 254, 255, etc., can enable adaption of various provider controlled network parameters, e.g., altering a network path between the UE and the NEC instance, modifying a RAN parameter to improve signal strength, reduce, packet loss, improve bandwidth, etc., or nearly any other wired or wireless network parameter related to communicating data between a UE and a NEC instance. In some embodiments, NEC/path adjustment data 254, 255, etc., can comprise CSP recommendations that can be employed by a CSP to alter services/applications of the NEC, e.g., NEC instance 234, NEC instance 244, etc. Adjustment of the NEC system, in an embodiment, can enable more efficient use of computing resources, e.g., network resources, processing resources, memory resources, storage resources, etc. In some embodiments, adjustment of an NEC system can enable expanding or contracting of NEC instances. In further embodiments, adjustment of an NEC system can enable altering the CSP service/application via communication with the CSP regarding performance of the NEC system. In still further embodiments, adjustment of an NEC system can enable migrating CSP service(s)/application(s) employed by a UE between one or more NEC instances.

NEC/PATH monitoring data 252 can be collected, for example via two-way active measurement protocol (TWAMP) components, etc., from components supporting communication between a UE, e.g., 202, 204, etc., and a NEC instance, e.g., NEC 234, 244, etc. This monitoring can be indicated by the dashed circle around RAN 214 components, AP 212 components, communication framework and/or EPC component 220, 222, etc. In an embodiment, key performance indicators (KPIs) such as latency, jitter, throughput, packet loss, etc., can be monitored. Additionally, application tolerances can be monitored, for example where provided by an application developer via an application profile, etc. Other metrics can include pricing, regional restrictions, etc., as an example, some paths may comprise path segments that can cause the path to be more expensive to use than other paths comprising other segments. As another example, some path segments of a path can not conform to path restrictions, such as path segment being outside/inside a jurisdictional boundary, etc. The KPIs and other metrics can be analyzed to determine a performance of the communication path between the UE and the NEC instance, determine performance of other paths that can be alternatives or supplementary paths between the UE and the NEC instances, etc. The analysis can, in an aspect, indicate how one or more network components are affecting the communication path and what alterative paths are available along with the alterative paths likely performance should they be employed in communications between the UE and the NEC instance. As an example, a network component of RAN 214 can be heavily burdened and a network component of AP 212 can be lightly burdened. In this example, a path between UE 202 and NEC 234 can be determined to be performing below a level of performance than is predicted if UE employs AP 212 in place of RAN 214. Accordingly, in this example, NEC adjusting component 250 can determine that it would be beneficial to adjust the path and can communicate this via NEC/path adjustment data 254, 255, etc., to facilitate updating the path to remove RAN 214 and insert AP 212. In another example, NEC/path monitoring data 252 can comprise measurements, a number of node hops for example, that can, after analysis via NEC adjusting component 250, indicate that accessing a first instance of an application via NEC instance 234 is slower than accessing a second instance of the application via NEC instance 244 and can indicate, via NEC/path adjustment data 254, 255, etc., that the path can be adjusted to facilitate access via NEC instance 244 in lieu of NEC instance 234.

Figure 3:
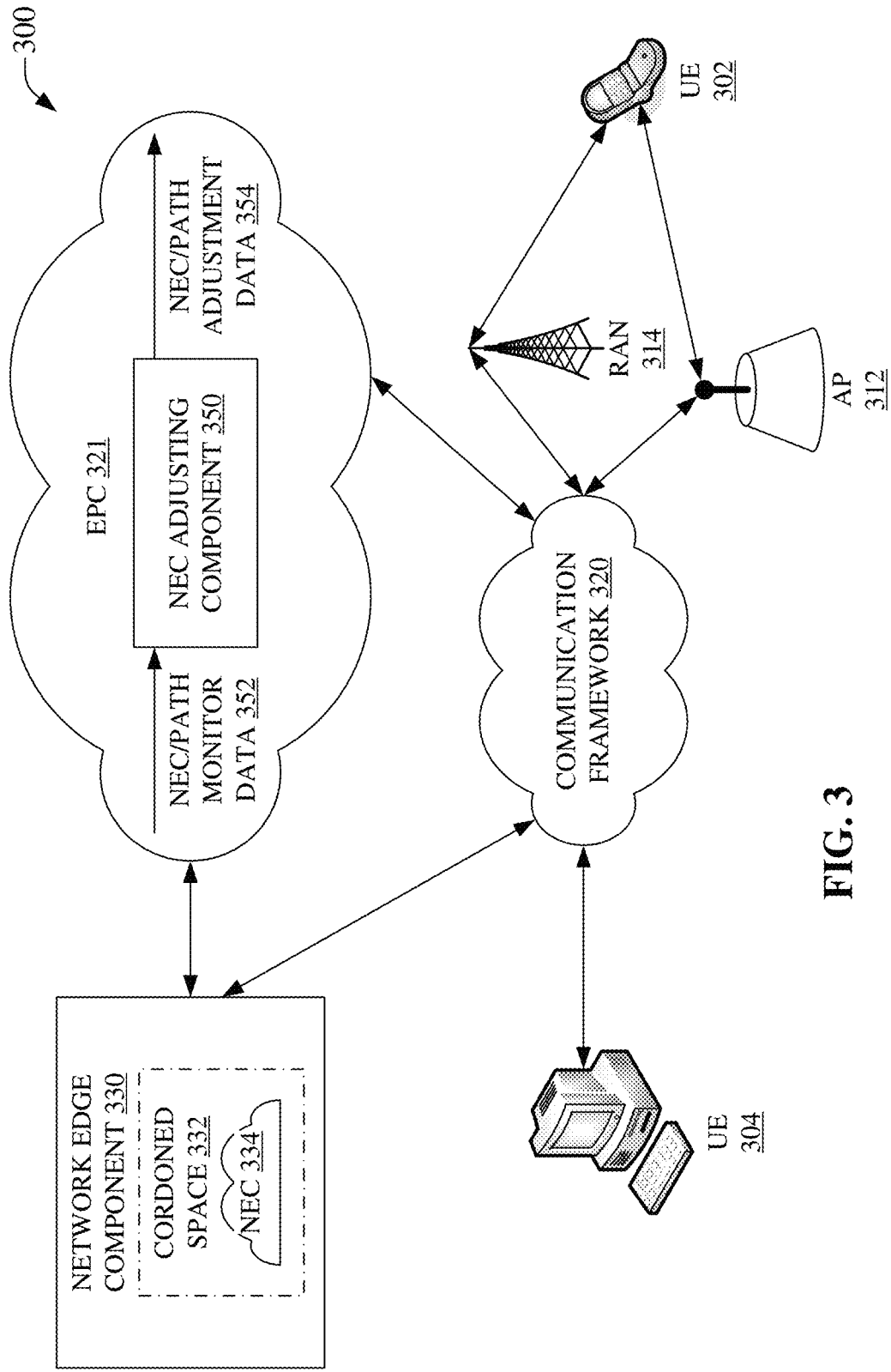
FIG. 3 is an illustration of an example system that can enable adjustment of a network edge cloud system, wherein an enhanced packet core can comprise a network edge cloud adjusting component, in accordance with aspects of the subject disclosure.

FIG. 3 is an illustration of a system 300 that can facilitate adjustment of a network edge cloud system, wherein an enhanced packet core can comprise a network edge cloud adjusting component, in accordance with aspects of the subject disclosure. System 300 can comprise NEC instance 334 that can be facilitated by cordoned space 332 of network edge component 330. In an aspect, network edge component 330 can be proximate to communication framework 320 and/or EPC instance 321, e.g., NEC instance 334 can be executing at, or near, to a core network/EPC component of a provider. Accordingly, UE 302 or 304 can more readily communicate, for example via RAN 314, AP 312, etc., with NEC instance 334 than a cloud instance via conventional cloud.

In system 300, for example, NEC adjusting component 350 can be comprised in EPC component 321. NEC adjusting component 350 can receive NEC/PATH monitoring data 352. NEC adjusting component 350 can determine changes that can be made to the NEC system and/or CSP recommendations based on the NEC system performance. In an aspect, NEC adjusting component 350 can generate NEC/path adjustment data 354 which can enable adaption of various provider controlled network parameters, e.g., altering a network path between the UE and the NEC instance, modifying a RAN parameter to improve signal strength, reduce, packet loss, improve bandwidth, etc., or nearly any other wired or wireless network parameter related to communicating data between a UE and a NEC instance. In some embodiments, NEC/path adjustment data 354 can comprise CSP recommendations that can be employed by a CSP to alter services/applications of the NEC, e.g., NEC instance 334. Adjustment of the NEC system, in an embodiment, can enable more efficient use of computing resources, e.g., network resources, processing resources, memory resources, storage resources, etc. In some embodiments, adjustment of an NEC system can enable expanding or contracting of NEC instances. In further embodiments, adjustment of an NEC system can enable altering the CSP service/application via communication with the CSP regarding performance of the NEC system. In still further embodiments, adjustment of an NEC system can enable migrating CSP service(s)/application(s) employed by a UE between one or more NEC instances.

NEC/PATH monitoring data 352 can be collected from components supporting communication between a UE, e.g., 302, 304, etc., and a NEC instance, e.g., NEC 334, e.g., from RAN 314 components, AP 312 components, communication framework 320 components, EPC 322 components, etc. In an embodiment, key performance indicators (KPIs) such as latency, jitter, throughput, packet loss, etc., can be monitored. Additionally, application tolerances can be monitored, for example where provided by an application developer via an application profile, etc. The KPIs and other metrics can be analyzed to determine a performance of the communication path between the UE and the NEC instance, determine performance of other paths that can be alternatives or supplementary paths between the UE and the NEC instances, etc. The analysis can, in an aspect, indicate how one or more network components are affecting the communication path and what alterative paths are available along with the alterative paths likely performance should they be employed in communications between the UE and the NEC instance.

In an aspect, NEC adjusting component 350 can be comprised in an EPC, e.g., via EPC component(s) 321. Whereas EPC 321 is typically operated by a network provider that can also operate network edge component 330 supporting NEC instance 334, the provider can generally have access to nearly any network metric related to communication between a UE and a NEC instance. Accordingly, one or more instances of a NEC adjusting component 350 can be implemented at one or more instances of EPC component 321, e.g., an NEC adjusting component instance can be deployed at one or more instances of regional EPC nodes. This can enable regional monitoring of NEC/path data, etc., at the corresponding regional EPC node generally corresponding to a local network edge component 330. As is noted elsewhere herein, a NEC can serve to shift the network provider from merely a pipe between a UE and a remotely located cloud server to both a network provider and a cloud server provider with unique advantages over other cloud server providers, e.g., more direct access to network metrics, ability to deploy network edge component(s) 350 proximate to network provider networks, etc. This can facilitate more control over the end-to-end path and performance of associated network elements than can be typically expected from conventional cloud server implementations.

Figure 4:
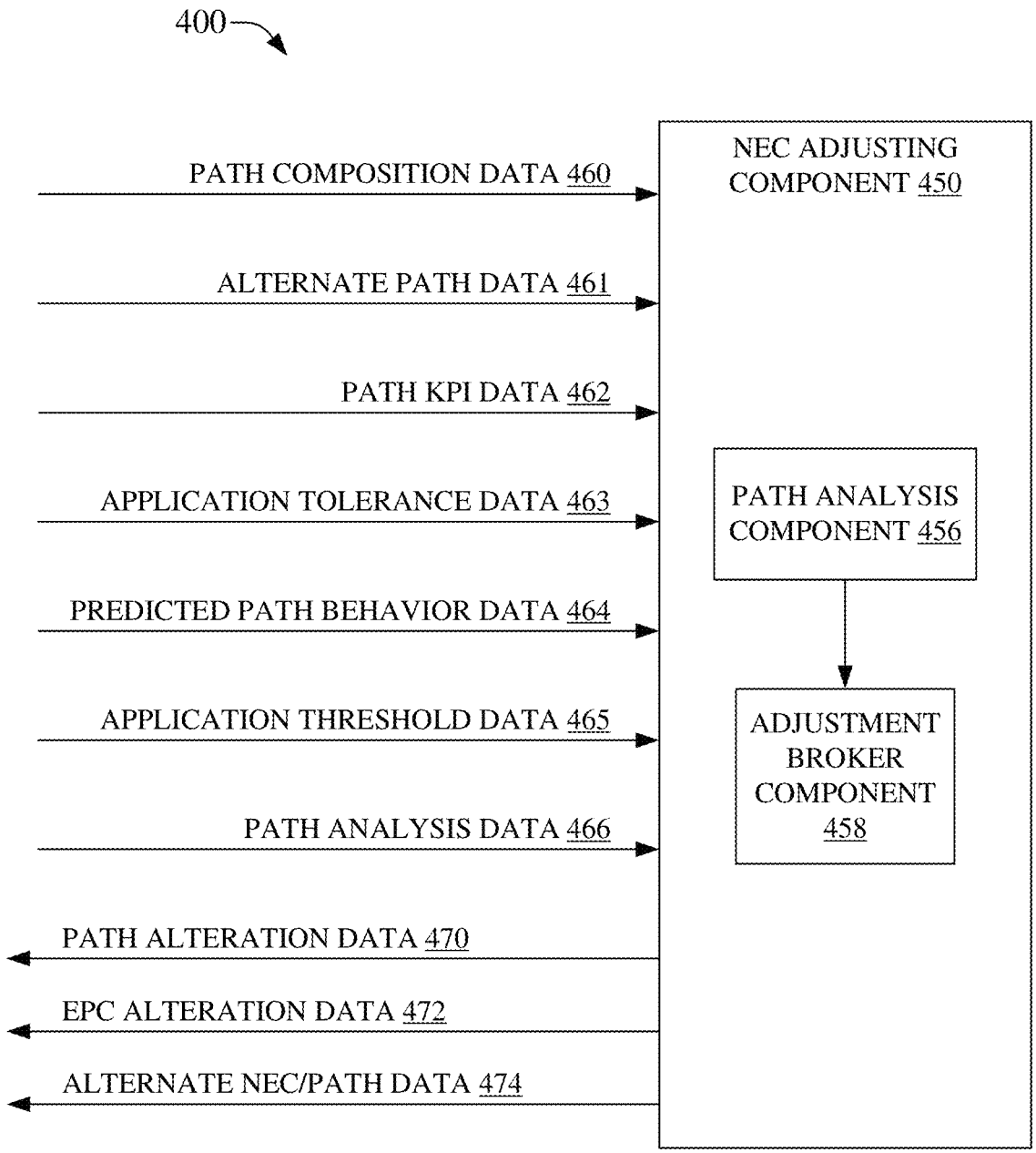
FIG. 4 illustrates an example system that can facilitate various adjustments to a network edge cloud system based on analysis of one or more inputs, in accordance with aspects of the subject disclosure.

FIG. 4 is an illustration of a system 400, which can enable adjustment of a network edge cloud system based on analysis of one or more inputs, in accordance with aspects of the subject disclosure. System 400 can comprise NEC adjusting component 450. NEC adjusting component 450 can comprise path analysis component 456 and adjustment broker component 458. In an aspect, NEC adjusting component 450 can receive NEC/path monitoring data, e.g., inputs 460 to 466, etc. Path component 456 of NEC adjusting component 450 can analyze one or more paths, including analysis of a current path, between a UE and an NEC instance. In an aspect, the analysis can determine if the current path is a preferred path, if another path is preferred, beneficial adjustments to a path, switching between or supplementing with another NEC instance, etc., based on NEC/path monitoring data. Additionally, NEC adjusting component 450 can determine beneficial adaptions to an application or service related to providing recommendations to a CSP. Moreover, path analysis component 456 can enable ranking of possible paths between a UE and one or more relevant NEC instances. As an example, a ranking can be based on best performance, lowest cost, fastest speed, highest reliability, lowest packet loss, etc.

Adjustment broker component 458 can be communicatively coupled to path analysis component 456 and can receive data related to analysis results. Adjustment broker component 458 can then determine signaling, instructions, recommendations, etc., related to implementing an adjustment of the NEC system. As an example, analysis by path analysis component 456 can indicate an alternate path is preferred to a current path and adjustment broker component 458 can determine signaling to cause implementation adjusting the path to employ the second path in lieu of the first path. In an aspect, this can be in the form of NEC/path adjustment data, e.g., outputs 470 to 474, etc.

Inputs, e.g., NEC/path monitoring data, can comprise path composition data 460 that can indicate a composition of a path between a UE and a NEC instance, e.g., which components of a network, e.g., a path, data is communicated through between the UE and the NEC instance. NEC/path monitoring data can further comprise alternate path data 461 that can indicate paths, other than a current path, between a UE and a NEC instance or another NEC instance. In an aspect, this can comprise indicating other network components and possible network hops between these other components. NEC/path monitoring data can additionally comprise path KPI data 462 that can indicate values of key performance indicators for a path, an alternate path, a component of a path, a component of an alternate path, etc. Further, NEC/path monitoring data can comprise application tolerance data 463 that can indicate acceptable network performance values related to an application/service being served by an NEC instance. NEC/path monitoring data can further comprise predicted path behavior data 464 that can be based on historical data and/or a model(s) of a path performance, e.g., historical path performances can be employed to inform a performance of a possible alternative path. Moreover, NEC/path monitoring data can comprise application threshold data 465 that can be related to preferred performance parameters of an application/service served by an NEC instance, e.g., indications that a threshold has been transitioned can be distinct from a tolerance, for example, transitioning a threshold can trigger an alert, notification, reduction/increase/change in application performance, etc., while a tolerance can directly trigger a prompt adaptation to bring the NEC system back into compliance with the tolerances of an application/service, etc. NEC/path monitoring data can further comprise path analysis data 466, which can comprise analysis performed by another NEC adjusting component instance(s), by another component, historical analysis, etc. In an aspect, this can enable NEC adjusting component 450 to use analysis performed by other components to reduce the computational/analytical load on an individual NEC adjusting component.

Outputs, e.g., NEC/path adjustment data, can comprise path alteration data 470 that can comprise data indicating an adjustment to a path between a UE and an NEC instance, instructions and/or signals to initiate and/or cause an adjustment to a path between a UE and an NEC instance, etc. NEC/path adjustment data can further comprise EPC alteration data 472 that can cause a change to an EPC component, for example, changing a priority of a signal and/or data being communicated via an EPC, etc. Additionally, NEC/path adjustment data can comprise alterative NEC/path data 474 that can comprise information enabling adapting a path to comprise a different NEC instance, e.g., adding an NEC instance, substituting an alternate NEC instance, etc.

Figure 5:
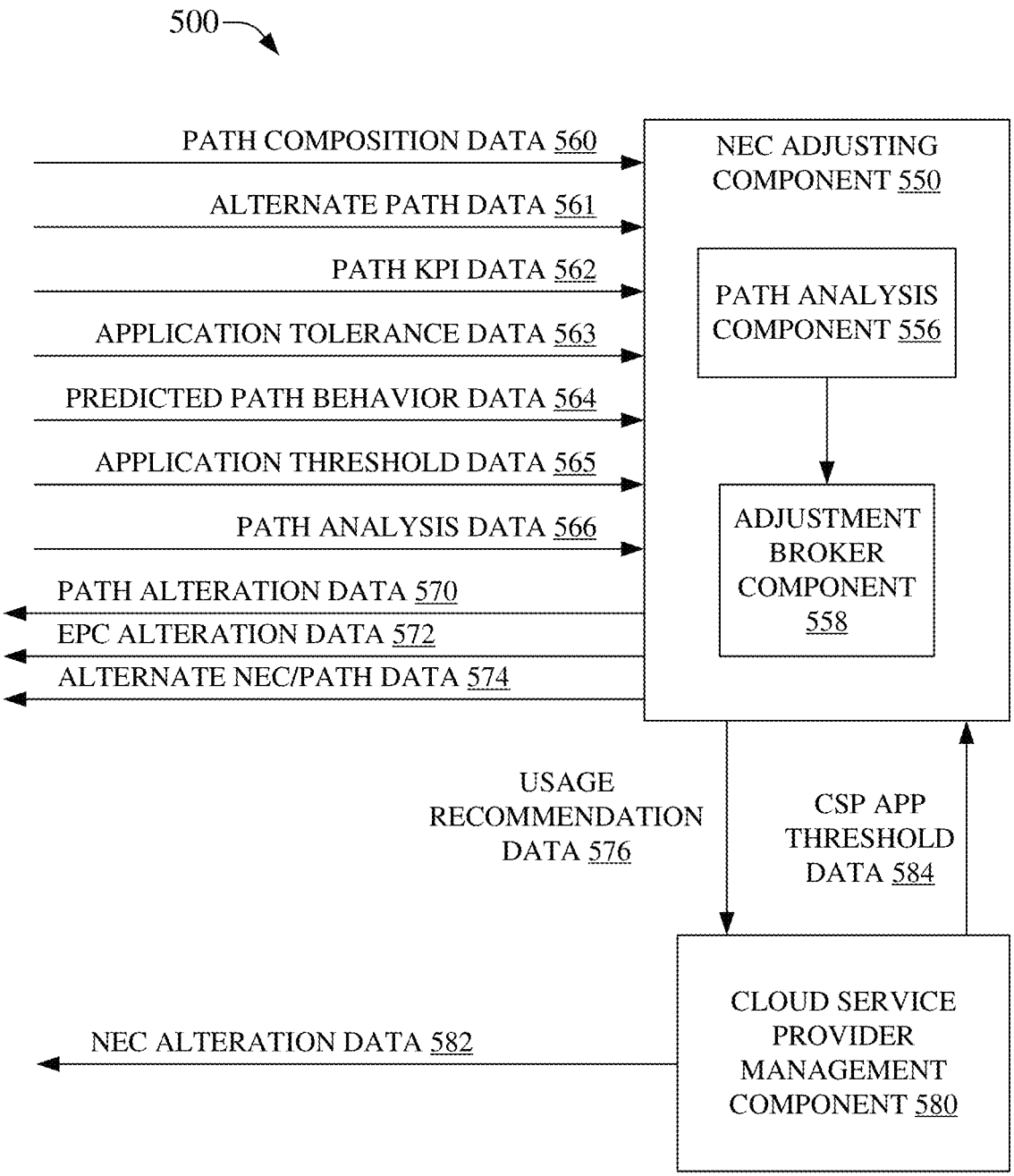
FIG. 5 is an illustration of an example system enabling adjustment of a network edge cloud system via a network provider component and a cloud service provider component, in accordance with aspects of the subject disclosure.

FIG. 5 is an illustration of an example system 500 that can facilitate adjustment of a network edge cloud system via a network provider component and a cloud service provider component, in accordance with aspects of the subject disclosure. System 500 can comprise NEC adjusting component 550. NEC adjusting component 550 can comprise path analysis component 556 and adjustment broker component 558. In an aspect, NEC adjusting component 550 can receive NEC/path monitoring data, e.g., inputs 560 to 566, etc. Path component 556 of NEC adjusting component 550 can analyze one or more paths, including analysis of a current path, between a UE and an NEC instance. In an aspect, the analysis can determine if the current path is a preferred path, if another path is preferred, beneficial adjustments to a path, switching between or supplementing with another NEC instance, etc., based on NEC/path monitoring data. Additionally, NEC adjusting component 550 can determine beneficial adaptions to an application or service related to providing recommendations to a CSP. Moreover, path analysis component 556 can enable ranking of possible paths between a UE and one or more relevant NEC instances. As an example, a ranking can be based on best performance, lowest cost, fastest speed, highest reliability, lowest packet loss, etc.

Adjustment broker component 558 can be communicatively coupled to path analysis component 556 and can receive data related to analysis results. Adjustment broker component 558 can then determine signaling, instructions, recommendations, etc., related to implementing an adjustment of the NEC system. As an example, analysis by path analysis component 556 can indicate an alternate path is preferred to a current path and adjustment broker component 558 can determine signaling to cause implementation adjusting the path to employ the second path in lieu of the first path. In an aspect, this can be in the form of NEC/path adjustment data, e.g., outputs 570 to 574, etc.

System 500 can further comprise CSP management component 580 that can receive usage recommendation data 576. CSP management component 580 can determine NEC alteration data 582 based in part on usage recommendation data 576. NEC alteration data 582 can cause alteration of an application and/or service provided via an NEC instance. In an aspect, alteration of the application/service can comprise altering a performance of the application/service, for example, changing a video resolution, changing an input/output modality, altering a an amount of computing resources consumed by the application/service, etc. Moreover, the alteration of the application/service can comprise performing the application/service via a different NEC instance, for example, moving the application/service to another NEC instance, adding the application/service to another NEC instance, removing the application/service from an NEC instance, etc. In an aspect, CSP management component 580, in some embodiments, can provide CSP application/service threshold data 584 that can relate to a threshold value of a characteristic of the application/service, e.g., a preferred performance parameter value of an application/service served by an NEC instance.

Inputs, e.g., NEC/path monitoring data, can comprise path composition data 560 that can indicate a composition of a path between a UE and a NEC instance, e.g., which components of a network, e.g., a path, data is communicated through between the UE and the NEC instance. NEC/path monitoring data can further comprise alternate path data 561 that can indicate paths, other than a current path, between a UE and a NEC instance or another NEC instance. In an aspect, this can comprise indicating other network components and possible network hops between these other components. NEC/path monitoring data can additionally comprise path KPI data 562 that can indicate values of key performance indicators for a path, an alternate path, a component of a path, a component of an alternate path, etc. Further, NEC/path monitoring data can comprise application tolerance data 563 that can indicate acceptable network performance values related to an application/service being served by an NEC instance. NEC/path monitoring data can further comprise predicted path behavior data 564 that can be based on historical data and/or a model(s) of a path performance, e.g., historical path performances can be employed to inform a performance of a possible alternative path. Moreover, NEC/path monitoring data can comprise application threshold data 565 that can be related to preferred performance parameters of an application/service served by an NEC instance, e.g., indications that a threshold has been transitioned can be distinct from a tolerance, for example, transitioning a threshold can trigger an alert, notification, reduction/increase/change in application performance, etc., while a tolerance can directly trigger a prompt adaptation to bring the NEC system back into compliance with the tolerances of an application/service, etc. NEC/path monitoring data can further comprise path analysis data 566, which can comprise analysis performed by another NEC adjusting component instance(s), by another component, historical analysis, etc. In an aspect, this can enable NEC adjusting component 550 to use analysis performed by other components to reduce the computational/analytical load on an individual NEC adjusting component.

Outputs, e.g., NEC/path adjustment data, can comprise path alteration data 570 that can comprise data indicating an adjustment to a path between a UE and an NEC instance, instructions and/or signals to initiate and/or cause an adjustment to a path between a UE and an NEC instance, etc. NEC/path adjustment data can further comprise EPC alteration data 572 that can cause a change to an EPC component, for example, changing a priority of a signal and/or data being communicated via an EPC, etc. Additionally, NEC/path adjustment data can comprise alterative NEC/path data 574 that can comprise information enabling adapting a path to comprise a different NEC instance, e.g., adding an NEC instance, substituting an alternate NEC instance, etc.

Figure 6:
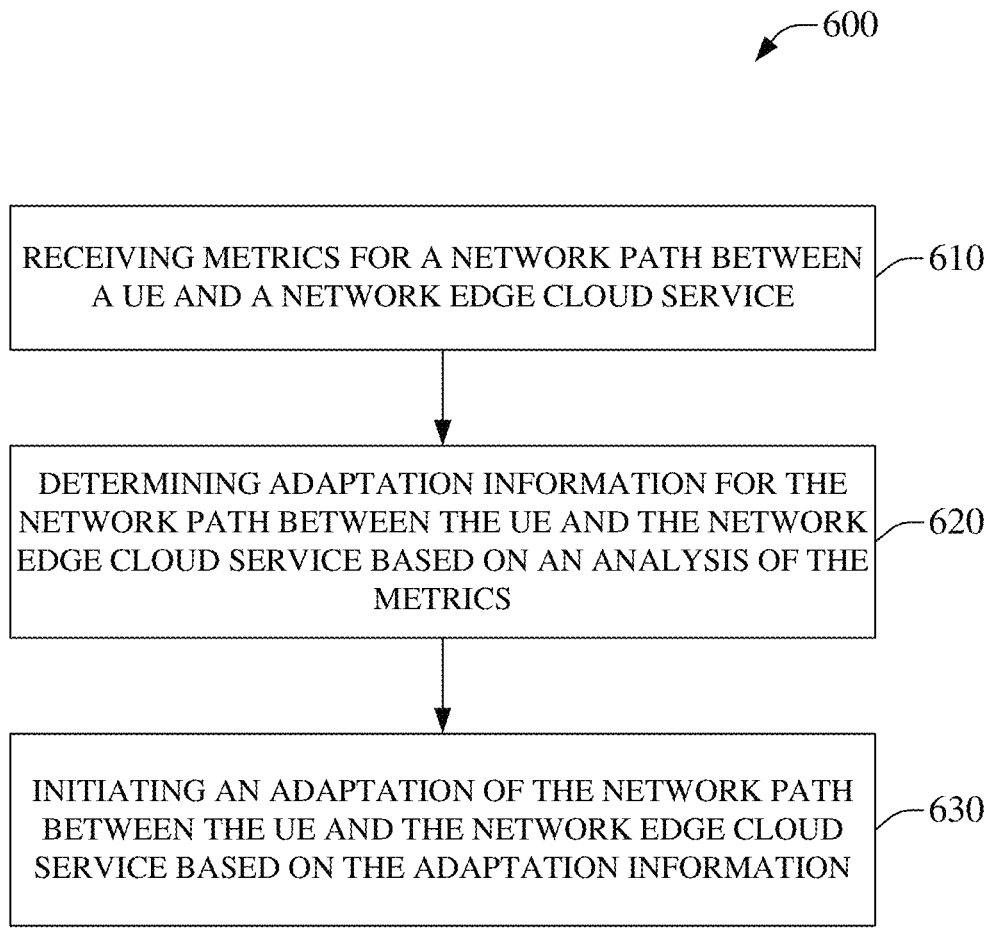
FIG. 6 is an illustration of an example method that can enable adjustment of a network edge cloud system, in accordance with aspects of the subject disclosure.

FIG. 6 is an illustration of an example method 600, which can enable adjustment of a network edge cloud system, in accordance with aspects of the subject disclosure. At 610, method 600 can comprise receiving metrics for a network path between a user equipment (UE) and network edge cloud (NEC) service. The metrics can indicate performance of segments of the network path, e.g., KPIs for the components comprising the network path and can indicate values relating to characteristics, such as, jitter, latency, throughput, workload, bandwidth, etc. These metrics can, in an aspect, indicate how well the network path is performing in regards to supporting an application/service supported by a NEC instance that can be supported at a network edge component located proximate to, or within, a network provider core network. In an aspect, supporting a NEC instance proximate to, or in, a provider's network can offer advantages over supporting a cloud service/application at a conventional cloud server that can be located, typically, at a great distance from a provider's network, for example, reducing round trip communication time, concentrating control of the network path with the provider rather than among several different entities, etc. As an example, where a network provider operates a multiple 5G user plane devices for a client, the network provider can be better positioned than other entities to modify or adapt a network path to a NEC instance when a UE transitions among the multiple 5G user planes, for example because the network provider can have direct access to the network metrics, can have direct control to adapt the network path, etc.

At 620, method 600 can comprise determining adaptation information of the network path between the UE and the NEC service/application based on an analysis of the metrics. An analysis of the metrics can indicate that changes to parameters of the path, changes to the devices comprising the path, adapting the end points of the path, etc., can improve the performance of the service application. As an example, a CSP customer can deploy an application on a first and second NEC instance, NEC1 and NEC2. A mobile application client can be communicating with the application on NEC1 via a first network path. The path being used can change, for example, if the UE transitions to another 5G Packet Core User Plane, etc. Accordingly, the changed path between the UE and NEC1 can be determined, based on analysis of path metrics, to be less efficient than adapting the path to cause the UE to communicate with another instance of the application on NEC2.

At 630, method 600 can comprise initiating the adaptation of the network path between the UE and the NEC service/application based on the adaptation information. At this point, method 600 can end. Continuing the above example, where the path is determined to be less efficient to NEC1 than to NEC2, the path can be adapted, such as by interfacing with an API exposure system to indicate that a change from NEC1 to NEC2 would be beneficial, e.g., initiating a change in the path from NEC1 to NEC2. As is noted hereinabove, this level of control can be unusual in conventional cloud service systems and a network provider can have an advantage over the conventional technology where the network provider can have control over both a network and an edge cloud component located proximate to the provider's network.

Figure 7:
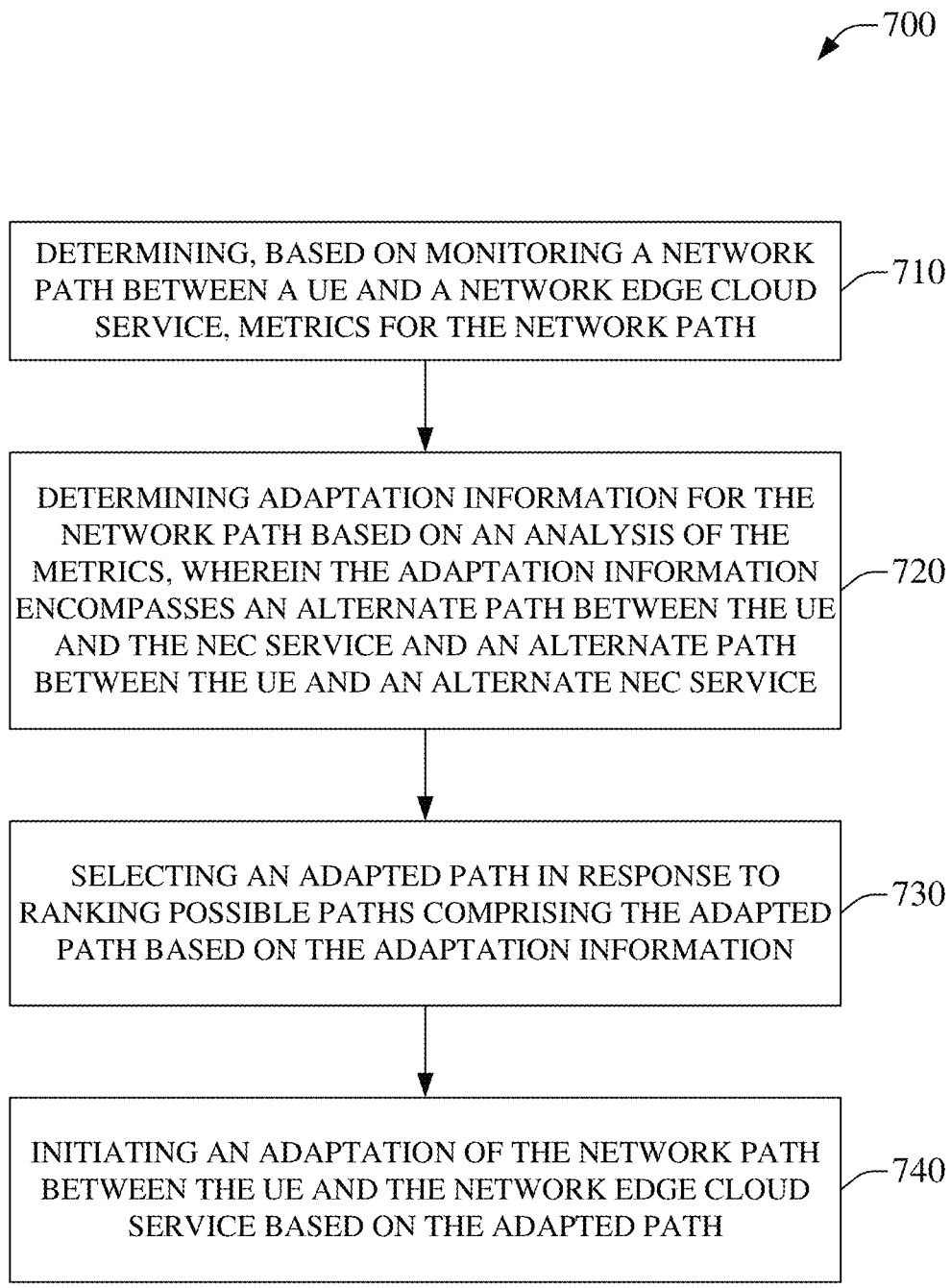
FIG. 7 illustrates an example method facilitating adjusting a network provider network supporting a network edge cloud based on analysis of one or more inputs, in accordance with aspects of the subject disclosure.

FIG. 7 illustrates example method 700 facilitating adjusting a network provider network supporting a network edge cloud based on analysis of one or more inputs, in accordance with aspects of the subject disclosure. Method 700, at 710, can comprise determining, based on monitoring a network path between a UE and a NEC service, metrics for the network path. In an aspect, supporting a NEC instance proximate to, or in, a provider's network can offer advantages over supporting a cloud service/application at a conventional cloud server that can be located, typically, at a great distance from a provider's network.

At 720, method 700 can comprise determining adaptation information for the network path between the UE and the NEC service/application based on an analysis of the metrics. An analysis of the metrics can indicate that changes to parameters of the path, changes to the devices comprising the path, adapting the end points of the path, etc., can improve the performance of the service application. The adaptation information can encompass an alternative path between the UE and the NEC service/application and can also encompass an alternative path between the UE and an alternative NEC service/application. As an example, a CSP customer can deploy an application on a first and second NEC instance, NEC1 and NEC2. A mobile application client can be communicating with the application on NEC1 via a first network path. The path being used can change, for example, if the UE transitions to another 5G Packet Core User Plane, etc. As in the above example, the changed path between the UE and NEC1 can be determined, based on analysis of path metrics, to be less efficient than adapting the path to cause the UE to communicate with another instance of the application on NEC2. However, the analysis can further indicate that other changes to the network path can result in a satisfactory path between the UE and the application on NEC1.

At 730, method 700 can comprise selecting an adapted path in response to ranking possible paths comprising the adapted path. The ranking can be based on the adaptation information. Continuing the above example, the path between the UE and the other instance of the application on NEC2 can be ranked and the alternative path between the UE and the application on NEC1 can be ranked. Based on this ranking, one of the path adaptations can be selected, for example selecting the alternative path between the UE and the application on NEC1, where, for example, this alternative path can provide satisfactory performance and can be less resource intensive than employing the path to NEC2.

At 740, method 700 can comprise initiating an adaptation of the network path between the UE and the NEC service/application based on the adapted path selected at 730. At this point, method 700 can end. Continuing the above example, where the path is determined to be less efficient to NEC1 than to NEC2, but an alternate path to NEC1 can be higher ranked, the path can be adapted to adapt the path between the UE and NEC1 rather than to NEC2.

Figure 8:
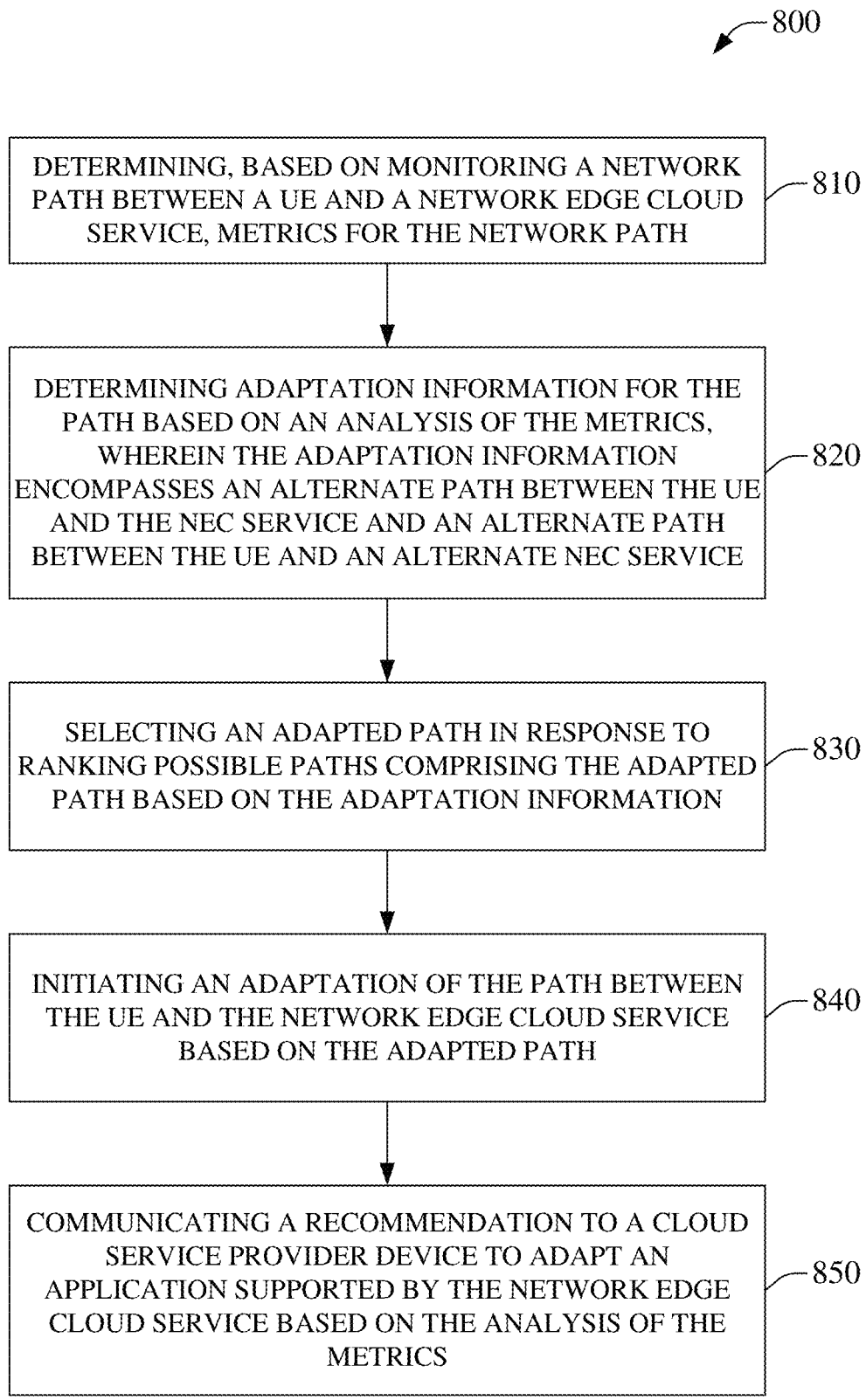
FIG. 8 illustrates an example method that enables adjustment of a network edge cloud system via a network provider component and a cloud service provider component, in accordance with aspects of the subject disclosure.

FIG. 8 illustrates example method 800, which can enable adjustment of a network edge cloud system via a network provider component and a cloud service provider component, in accordance with aspects of the subject disclosure. Method 800, at 810, can comprise determining, based on monitoring a network path between a UE and a NEC service, metrics for the network path. In an aspect, supporting a NEC instance proximate to, or in, a provider's network can offer advantages over supporting a cloud service/application at a conventional cloud server that can be located, typically, at a great distance from a provider's network.

At 820, method 800 can comprise determining adaptation information for the network path between the UE and the NEC service/application based on an analysis of the metrics. An analysis of the metrics can indicate that changes to parameters of the path, changes to the devices comprising the path, adapting the end points of the path, etc., can improve the performance of the service application. The adaptation information can encompass an alternative path between the UE and the NEC service/application and can also encompass an alternative path between the UE and an alternative NEC service/application. Additionally the analysis can indicate that the application/service can be adapted to alter performance within the capabilities of the network path as indicated by the metrics. Adaptation of the application/service can be addressed at 850 of method 800.

At 830, method 800, as before, can comprise selecting an adapted path in response to ranking possible paths comprising the adapted path. The ranking can be based on the adaptation information. At 840, method 800, also as before, can comprise initiating an adaptation of the network path between the UE and the NEC service/application based on the adapted path selected at 830.

Method 800, at 850, can comprise communicating a recommendation to a CSP device to adapt an application supported by the NEC service based on the analysis of the metrics. At this point, method 800 can end. In an aspect, an application/service can be managed by the CSP rather than the network provider. As an example, the CSP can 'rent' space for the NEC instance from the provider, e.g., the provider can cordon off space in a network edge device for the CSP to perform the NEC instance having the service/application. Accordingly, the provider can provide a recommendation to the CSP rather than modifying the application/service directly. Adapting the application/service, by the CSP, can alter the operation of the application/service within the changing constraints of the provider network. As an example, where a new service is being deployed with low initial demand and correspondingly low demands on network computing resources, the CSP can have implemented a feature rich version of the application that can consume more network computing resources per instance. As the example application grows in popularity, there can be increased demand and increased consumption of network computing resources. As such, changes in the network can start to approach application threshold values. Analysis of the path metrics can indicate that the path is, for example, approaching full utilization. Accordingly, in this example, method 800, at 850, can indicate to the CSP that a more conservative use of network resources by the application can forestall possible violation of application tolerances. The CSP can then use this recommendation to determine if it will alter the application to be, for example, more conservative of network computing resources, remain the same and accept possible tolerance violations, remain the same but purchase improved network computing resources, etc.

Figure 9:
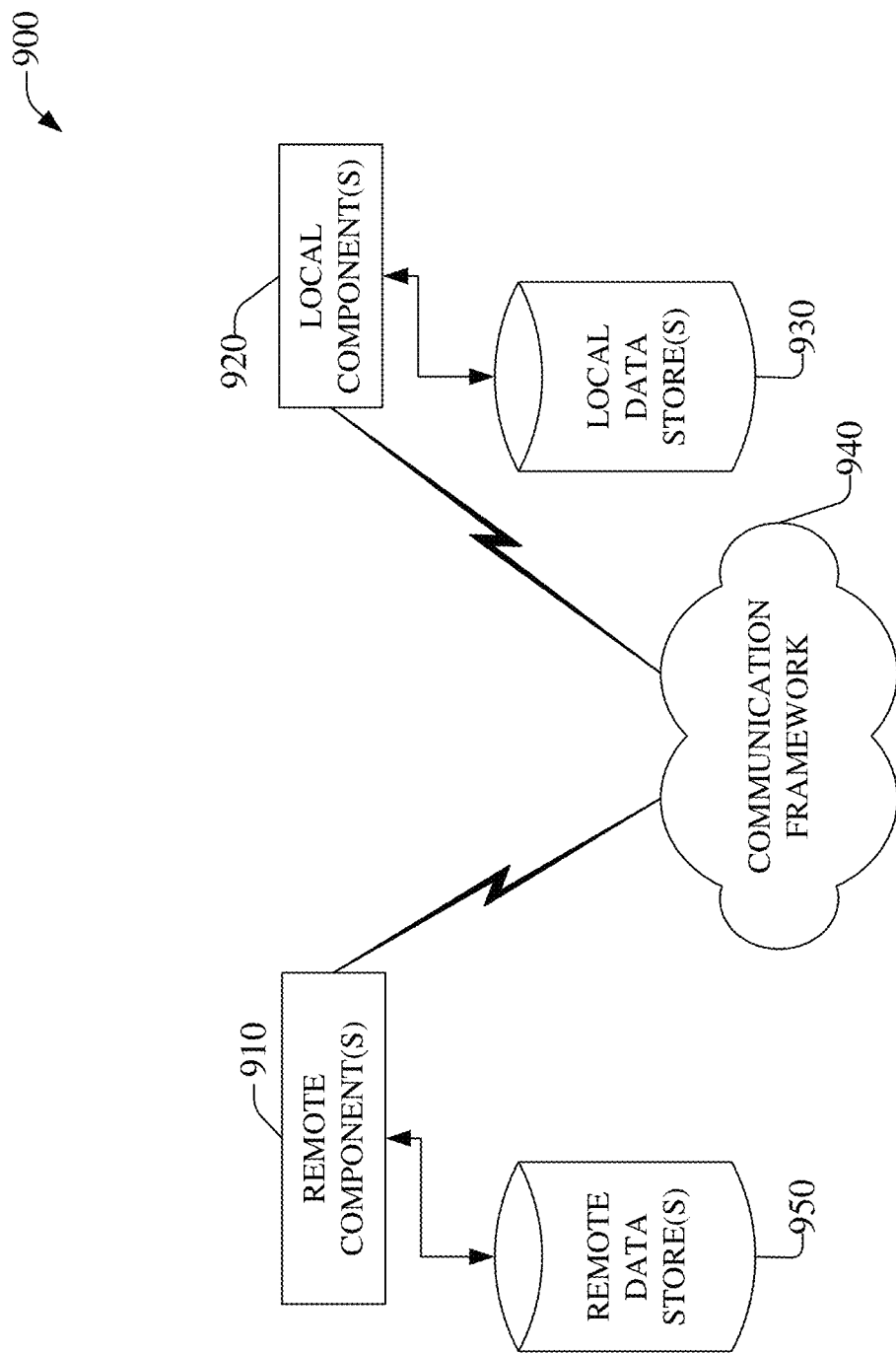
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise UE 102, 104, etc., network edge component 130, 140, 230, 240, 330, etc., network edge component adjusting component 150, 250, 350, 450, 550, etc., communication framework and/or EPC 120, 220, etc., communication framework 320, etc., EPC 321, or other remotely located components, including for example, communication framework 124-126, conventional cloud 127, etc.

The system 900 also comprises one or more local component(s) 920. The local component(s) 920 can be hardware and/or software (e.g., threads, processes, computing devices). In some embodiments, local component(s) 920 can comprise UE 102, 104, etc., network edge component 130, 140, 230, 240, 330, etc., network edge component adjusting component 150, 250, 350, 450, 550, etc., communication framework and/or EPC 120, 220, etc., communication framework 320, etc., EPC 321, or other locally located components.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s)

910 side of communication framework 940. As an example, SINR determination component 120 can store SINR prediction model(s), SINR determination model(s), SINR value(s), current or historical channel characteristic(s), current or historical environmental feature(s)/condition(s)/event(s), etc. Similarly, local component(s) 920 can be operably connected to one or more local data store(s) 930, that can be employed to store information on the local component(s) 920 side of communication framework 940. As an example, RAN 110 can store current or historical channel characteristic(s), current or historical environmental feature(s)/condition(s)/event(s), etc.

Figure 10:
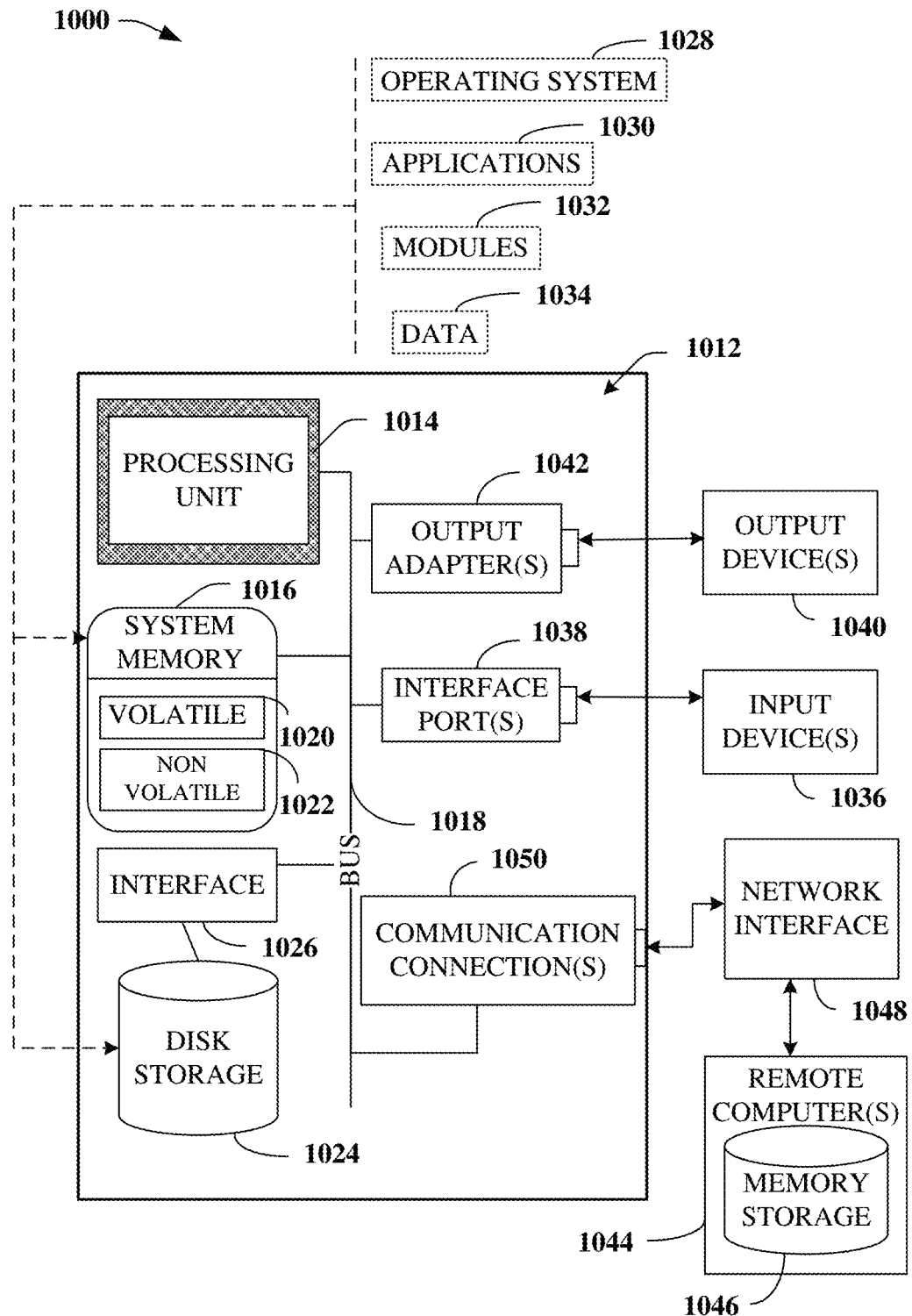
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in network edge component 130, 140, 230, 240, 330, etc., NEC adjusting component 150, 250, 350, 450, 550, etc., communication framework and/or EPC 120, 220, etc., communication framework 320, etc., EPC 321, or nearly any other device, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a first performance of a first network edge cloud path, wherein a first edge device is proximate to a core network device and, in response to ranking a second network edge cloud path against the first network edge cloud path, causing an adaptation of the first network edge cloud path based on the second network edge cloud path.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted elsewhere herein, wireless technologies may be used in addition to or in place of the foregoing.

Communication connection(s) 1050 refer(s) to hardware/ software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," "5G network radio," and the like, are utilized interchangeably in the subject application, and refer to a wireless network component or appliance that serves and receives data, control, voice, video, sound, gaming, or substantially any datastream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to as extremely high frequency (EHF) waves. The wavelength (λ) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations comprising:
   determining a first network edge cloud path parameter for a first network edge cloud path between a user device and a first edge device supporting a first network edge cloud instance, wherein the first edge device is operated by a network provider and is proximate to a core network device that is also operated by the network provider, wherein operation of the first network edge cloud instance is based on instructions received via a network device associated with a network provider identity corresponding to the network provider, and wherein the operation of the first network edge cloud instance enables control over performance of the first network edge cloud instance; and in response to determining that the first network edge cloud path parameter does not satisfy a first rule related to network edge cloud path performance, initiating a change to the first network edge cloud path.

2. The device of claim 1, wherein the operations further comprise determining a first alternate network edge cloud path between the user device and a second edge device supporting a second network edge cloud instance, wherein the initiating the change to the first network edge cloud path results in establishment of a second network edge cloud path between the first user device and the second network edge cloud instance supported by the second edge device, and wherein the second network edge cloud path is based on the first alternate network edge cloud path.

3. The device of claim 2, wherein the first alternate network edge cloud path is selected from alternate network edge cloud paths determined as able to connect the user device to an alternate service equivalent to a service supported by the first network edge cloud instance, wherein the first alternate network edge cloud path is associated with a second network edge cloud path parameter, and wherein the second network edge cloud path parameter is determined to satisfy the first rule related to network edge cloud path performance.

4. The device of claim 2, wherein the second edge device is a same edge device the first edge device.

5. The device of claim 2, wherein the second edge device is a different edge device than the first edge device.

6. The device of claim 5, wherein the second edge device is located remotely from the first edge device.

7. The device of claim 1, wherein the initiating the change to the first network edge cloud path results in the first network edge cloud path parameter satisfying the first rule related to network edge cloud path performance.

8. The device of claim 1, wherein the operations further comprise signaling a service supported by the first network edge cloud instance, and wherein the signaling results in the service altering a performance of the service.

9. The device of claim 8, wherein the signaling that results in the service altering the performance of the service results in the service altering an amount of data being communicated via the first network edge cloud path between the user device and the first edge device supporting the first network edge cloud instance.

10. The device of claim 9, wherein the altering the amount of data being communicated via the first network edge cloud path results from altering a user interface mode of a user interface employed by the service.

11. The device of claim 10, wherein the altering the user interface mode of the user interface employed by the service comprises changing between a voice input modality, presented via the user device by the first network edge cloud instance, and a touch screen modality, presented via the user device by the first network edge cloud instance.

12. A method, comprising:
receiving, by a system comprising a processor, a first network edge cloud path metric for a first network edge cloud path between a user device and a first edge device supporting a first network edge cloud instance, wherein the first edge device is proximate to a core network device, and wherein operator input associated with a network provider entity directly enables control over operation of the first network edge cloud instance;

determining, by the system, a first property of a second network edge cloud path that is different from a second property of the first network edge cloud path based on a second network edge cloud path metric for a second network edge cloud path;

selecting, by the system, the second network edge cloud path based on the first property; and initiating, by the system, a change to the first network edge cloud path based on the second network edge cloud path.

13. The method of claim 12, wherein the determining the first property comprises determining a ranking of the second network edge cloud path based on the second network edge cloud path metric for the second network edge cloud path between the user device and the first edge device supporting the first network edge cloud instance.

14. The method of claim 12, wherein the determining the first property comprises determining a ranking of the second network edge cloud path based on the second network edge cloud path metric for the second network edge cloud path between the user device and a second edge device supporting a second network edge cloud instance.

15. The method of claim 14, wherein the first network edge cloud instance facilitates use of a first application, and wherein the second network edge cloud instance facilitates use of a second application that is a same application as the first application.

16. The method of claim 12, wherein the initiating the change to the first network edge cloud path based on the second network edge cloud path results in establishing a connection between the user device and a second network edge cloud instance executing on a second edge device that is proximate to a second core network device and is also located remotely from the first edge device.

17. A non-transitory machine-readable medium, comprising executable instructions that, when executed by a processor, facilitate performance of operations, comprising:
determining a first performance of at least a portion of a first network edge cloud path between a user device and a first edge device supporting a first network edge cloud instance, wherein the first edge device is proximate to a core network device, wherein the processor is comprised in the core network device, wherein operational control of the first network edge cloud instance is based on operator input received via the core network device, and wherein the operator input is associated with a network provider identity of a network comprising the core network device and the first edge device;

in response to determining a difference between a first performance of the first network edge cloud path and a second performance of at least a portion of a second network edge cloud path, selecting the second network edge cloud path based on the difference; and causing an adaptation of the first network edge cloud path based on the second network edge cloud path.

18. The non-transitory machine-readable medium of claim 17, wherein the second network edge cloud path is between the user equipment and the first edge device supporting the first network edge cloud instance.

19. The non-transitory machine-readable medium of claim 17, wherein the second network edge cloud path is between the user equipment and a second edge device supporting a second network edge cloud instance.

20. The non-transitory machine-readable medium of claim 19, wherein the second edge device is located remotely from the first edge device.

\* \* \* \* \*